(12) United States Patent
Johnson et al.

(10) Patent No.: US 7,116,093 B2
(45) Date of Patent: Oct. 3, 2006

(54) TONE GENERATOR AND PROBE

(75) Inventors: Darrell J. Johnson, La Mesa, CA (US); John C. McCosh, San Diego, CA (US)

(73) Assignee: Psibor Data Systems, Inc., La Mesa, CA (US)

(*) Notice: Subject to any disclaimer, the term of this patent is extended or adjusted under 35 U.S.C. 154(b) by 394 days.

(21) Appl. No.: 10/768,470

(22) Filed: Jan. 30, 2004

(65) Prior Publication Data

US 2004/0184620 A1    Sep. 23, 2004

(51) Int. Cl.
G01R 23/167    (2006.01)
G01R 19/00    (2006.01)

(52) U.S. Cl. .................. 324/76.28; 324/66; 379/25

(58) Field of Classification Search ........... 324/76.28, 324/66; 379/25
See application file for complete search history.

(56) References Cited

U.S. PATENT DOCUMENTS 3,882,287 A * 5/1975 Simmonds ............ 379/25
4,458,113 A * 7/1984 Tolman ............... 379/25
4,506,210 A * 3/1985 Chase ................ 324/66

* cited by examiner

Primary Examiner—Vincent Q. Nguyen (57) ABSTRACT

The tone generator uses a highly accurate frequency signal to generate an accurate and stable tone signal. A cadence pattern may be used to output the tone signal onto a test cable in an easily distinguishable pattern. The tone signal may be selectively output at an in-band band frequency or an out-band frequency. A corresponding tone probe may be used to detect the tone signal. The tone probe uses a high-Q bandpass filter to reject all but the expected frequency of the tone signal. The signal passing the bandpass filter is proportional to the detected tone signal. The tone probe generates an audio signal unrelated to the frequency of the tone signal. The audio signal is modulated by the signal from the bandpass filter, and then broadcast through a speaker. Accordingly, the tone probe provides an audible sound proportional to the strength of the tone signal, but is unrelated in frequency.

9 Claims, 6 Drawing Sheets

TONE GENERATOR AND PROBE

BACKGROUND

The field of the present invention is electronic test systems. More particularly, the present invention relates to a cable test system comprising a tone generator and a tone probe.

The tremendous growth in communications systems has dramatically increased the complexities of maintaining cabling systems within a building or a business campus. Indeed, with the proliferation of phone and computer cabling, businesses and even individuals spend considerable time and resource installing, testing, and maintaining cabling systems.

In a typical cabling installation, wiring ports or jacks are provided at wall outlets throughout a building. Cables run from each of the port outlets to a central location, such as a network closet. In the network closet, each of the incoming cables is connected to an appropriate device, such as a phone panel or a network hub, router, or switch. Other connections are provided from the network closet to larger voice or data networks. Even a modest cabling installation will have several network closets or other locations to concentrate cable access.

A typical network closet for even a moderately sized business may contain hundreds, if not thousands of incoming cables. During initial installation, for example, generally one set of technicians will route the cables from the wall port, through the building infrastructure, and to the network cabinet. Another set of technicians typically completes the physical connections. In this regard the technicians making the physical connections may be presented with a maze of cables and must determine which cable in the network closet is routed to each of the physical wall outlets.

To assist in identifying cables, cable testing systems have been developed. In the known cable testing system, a tone generator is coupled to a cable at a particular wall outlet position. The tone generator applies a signal in the audio frequency, typically about 1 KHz, to the cable. A technician in the network closet uses a tone probe to search for the cable transmitting the tone signal. The tone probe has a probe tip which the technician runs adjacent to each of the cables. As the tone probe begins detecting the tone signal, the tone signal is amplified and broadcast on a speaker. For example, if the tone generator applies a 1 KHz tone signal to the cable, the technician will hear a 1 KHz audio signal as the probe tip detects the tone signal.

As the tone probe is brought nearer the cable having the tone signal, the output from the speaker will become louder, thereby informing the technician which cable actually carries the tone signal. In this regard the technician in the network closet is able to detect which of a multitude of cables is the cable connected to the point of interest. To assist in identifying a particular cable, some known tone generators produce a tone signal with a varying frequency. The changes in frequency cause the tone probe to broadcast a siren-like sound.

In another use of the known cable testing system, the tone generator/tone probe combination may be used to find physical breaks in a cable. For example, if a particular run of cable is suspected of having a physical break, the tone generator once again could be coupled to the wall outlet at the port. The tone probe may then be moved along the cable path until the tone probe can no longer detect the tone signal. Provided the tone probe has sufficient sensitivity, the place where the tone probe loses the tone signal is likely to be where there is a physical disruption to the cable. Often, such a physical disruption may have caused by a nail or screw inadvertently driven through the cable. The cable test system thereby enables non-intrusive break detection for cables, avoiding the time and expense of rerouting cables or significant demolition of walls or other structures.

The typical known tone generator provides a tone signal in the audible band, generally around 1 KHz. Since the known tone probe may be used on voice phone lines, the tone generators provide a signal within the expected frequency band of the phone line. Due to the electrical sensitivities of devices which may be coupled to the cable, and for safety reasons the power applied to the tone signal is quite limited. Accordingly, the tone probe must be highly sensitive to detect the presence of the tone signal. The in-band tone signal, when detected and amplified, provides an audible signal readily perceived by most humans.

Known tone probes are constructed to detect signals at about the tone signal frequency. In order to increase the likelihood of detecting a signal, the typical tone probe detects a fairly wide range of frequencies. For example, if the tone generator outputs a signal at about 1 KHz, then the tone probe may be sensitive and respond to signals within 100 or more Hz above or below that value. The wide sensitivity range is useful as the initial frequency generated by the tone generator may not be very accurate, and the frequency of the tone signal may vary widely over time due to environmental or other conditions. Further, a single tone probe may be used to detect tone signals generated by several tone generators, and the frequency may vary considerably between tone generators.

Also, since the tone signal radiating from the test cable is very small, the signal detected by the probe tip is typically greatly amplified. In this regard, the known tone probe uses a high gain amplifier to amplify signals near the expected tone frequency. The tone probe may use filters to remove some noise, and then broadcast the amplified signals on a speaker.

Unfortunately, tone probes are known to also detect and react to a wide range of spurious signals. For example, the probe may pick up noise from fluorescent lights, computer monitors, or other signals being transmitted on the test cable. Since a tone probe cannot distinguish the source of these signals, the probe either indicates the false presence of the tone generator, or presents an obnoxious level of noise.

Further, when the tone probe begins detecting the tone signal, the speaker begins amplifying the signal and broadcasting the amplified signal to the operator. Unfortunately, the broadcast signal and electronics driving the speaker may cause feedback into the probe tip. Such feedback may cause an annoying runaway feedback problem, and if not stopped in time may damage the tone probe. Due to such feedback problems, operators often turn the volume down on the tone probe in operation. In such a case, the operator may then be unaware of the presence of a tone signal because the volume is set too low.

It has proven particularly difficult to identify the terminus points for Ethernet networking cables. The problem is especially difficult for existing cabled environments. For example, a computer may be connected to an Ethernet port in an office wall. The cable is routed through the office walls to a network cabinet, where the cable is physically coupled to a hub, router, or switch. Even in a moderately sized company, a network cabinet may have dozens or even hundreds of Ethernet cables connected into such network devices. Typically, each network device has a link LED showing that the cable has established communication between the network device and the client device, such as the personal computer. However, when the technician desires to identify a specific cable, it is typically a time consuming and frustrating job to find the particular device and port attachment for a specific cable.

Accordingly, there is a need for a cable test system capable of more accurately and efficiently identifying cables and cable connections.

SUMMARY

To overcome the deficiencies as described above, and to provide a cable test system with improved accuracy and efficiency, a new tone generator and tone probe is described. Briefly, the tone generator uses a highly accurate frequency signal to generate an accurate and stable tone signal. A cadence pattern may be used to output the tone signal onto a test cable in an easily distinguishable pattern. In a specific arrangement, the tone signal may be selectively output at an in-band frequency within the frequency range of information signals on the cable, or an out-band frequency outside the frequency range of information signals on the cable.

A corresponding tone probe may be used to detect the tone signal. As the tone signal's frequency is highly accurate and stable, the tone probe uses a high-Q bandpass filter to reject all but the expected frequency of the tone signal. In a specific example, the bandpass filter is implemented digitally to efficiently reject all but the desired narrowband frequency. The signal passing the bandpass filter is proportional to the detected tone signal, so may be used to drive an LED array to display the relative strength of the detected tone signal. The tone probe also includes an audio signal generator, which generates an audio signal unrelated to the frequency of the tone signal. The generated audio signal is modulated responsive to the signal from the bandpass filter, and then driven through a speaker. Accordingly, the tone probe provides an audible signal proportional to the strength of the tone signal, but is unrelated in frequency.

Advantageously, the tone generator and tone probe cooperate to provide a cable testing system having exceptional accuracy, ease of use, and efficiency. For example, when the tone generator is used to generate an out-band tone signal, the tone signal enables cable test and detection without interrupting in-band communication and signals. In such a manner, the out-band toning capability acts as a non-intrusive test for a cable. Also, since the tone generator provides a tone signal with a highly stable and accurate frequency, the tone probe may be constructed with a very high-Q bandpass filter, enabling excellent noise rejection. Further, since the sound broadcast from the tone probe has a frequency unrelated to the detected tone probe frequency, feedback and other undesirable effects are eliminated or substantially reduced.

DETAILED DESCRIPTION

Figure 1:
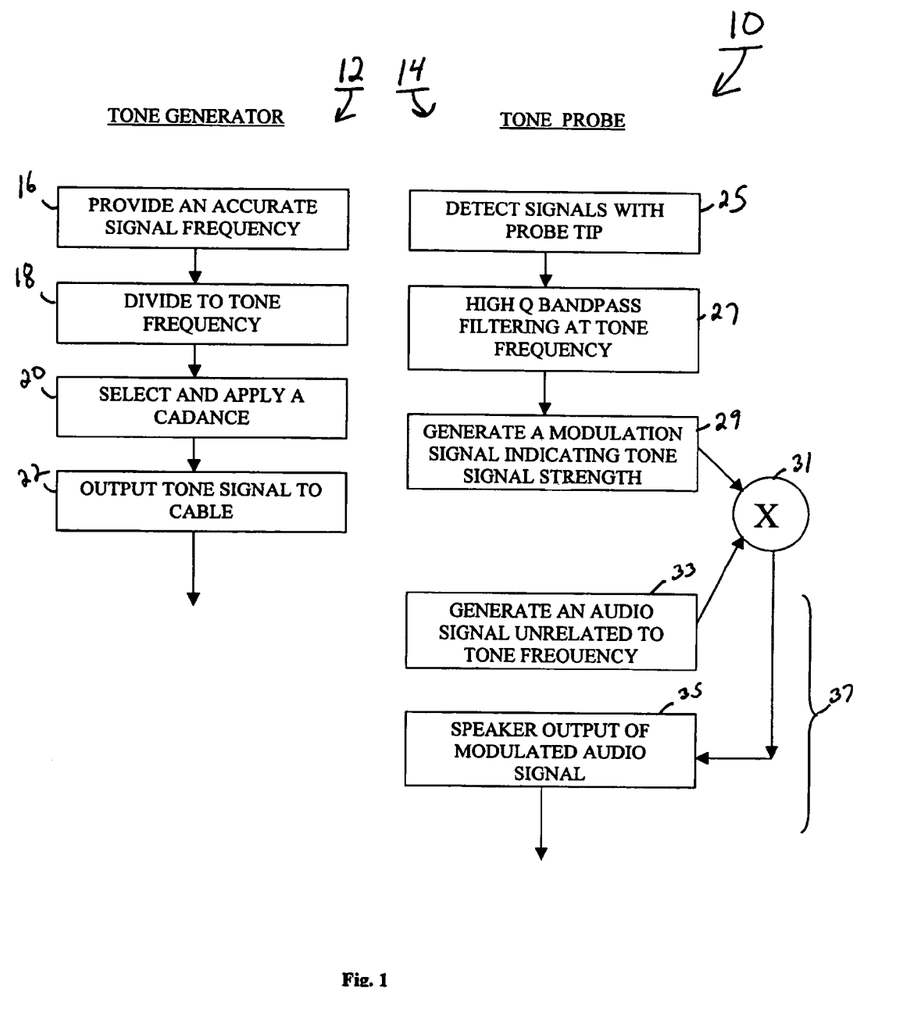
FIG. 1 is a block diagram of a method for a cable test system in accordance with the present invention.

Referring to FIG. 1, a cable test system 10 in accordance with the present invention is shown. The test system 10 generally includes a tone generator 12 and a tone probe 14. The tone generator 12 is constructed to apply a tone signal to a test cable. The tone probe 14, which is physically distinct from the tone generator, may be placed adjacent the test cable. When the tone probe 14 detects a tone signal on the test cable, the tone probe indicates the presence of the tone signal to a user. In such a manner, test system 10 enables the user to efficiently detect physical defects in the test cable.

Tone generator 14 includes circuitry to provide a highly accurate and stable signal frequency as shown in block 16. Typically, the accurate signal frequency will be at a very high frequency, such as several MHz. The high frequency accurate signal is then divided in block 18 down to a tone signal frequency. Preferably, the tone signal frequency is in the audible band, which is generally between 200 Hz and about 10,000 Hz. However, it will be appreciated that the tone generator may generate signals out of the audible band for detection by a cooperating tone probe. In a particular embodiment of the tone generator, the tone generator provides a tone signal out of band of the normally expected signals on the cable. In this way, the tone signal does not interfere with communications or signals on a cable. For example, if a cable is carrying audio band signals, providing a tone signal out of the audio band will enable cable test and tone detection without substantially disrupting the audio communication. It will be appreciated, then, that the tone signal is not to be limited to the audio band.

In block 20 a cadence pattern is selected and applied to the tone signal. For example, a cadence may modulate the duty cycle of the tone signal to be a simple continuous on/off pattern. In another example, the cadence may adjust the duty cycle of the tone frequency in a way that provides a series of long and short beeps in a distinctive arrangement. It would be appreciated that a tone generator may be constructed to use a single cadence, or may provide multiple cadences for user selection. It will also be appreciated that the cadence pattern may be applied at different parts of the tone generator circuit.

The tone signal pattern is then output to the test cable as shown in block 22. The pattern facilitates distinguishing the tone generator signal from other signals. For example, other users may be in the area applying tones to other cables. With a distinctive tone pattern, each user may be able to distinguish their pattern and more accurately identify the test cable of interest. Further, the tone pattern would enable a user to distinguish the tone signal from any other audio signal that may be present on the test cable.

With the tone generator 12 applying a tone pattern signal to the test cable, the tone probe 14 is used to detect the tone signal. The tone probe 14 detects cable signals with the probe tip as shown in block 25. Since it is likely that other signals may be present on the test cable or received form other devices, the detected cable signal must be filtered as shown in block 27. More particularly, the cable signal is filtered using a high Q bandpass filter set to pass signals at or very near the expected tone frequency. Using a high Q filter enables the rejection of nearly all noise and other signals from further processing. Accordingly, the signal resulting from the high Q band pass filter indicates the relative strength of the tone signal on the test cable with a high degree of trustworthiness.

In block 29, the signal coming from the high Q bandpass filter is used to generate a modulation signal. The modulation signal indicates the tone signal strength on the test cable. Accordingly, the modulation signal may be useful for providing a visual strength indication, or to enable other circuitry to be responsive to detected signal strength.

An audio signal is generated in block 33. The audio signal has a frequency unrelated to the tone frequency generated by a corresponding tone generator. For example, if the tone generator 12 is outputting a tone signal of about 800 Hz, then the audio generated in block 33 may be, for example, generated at 1250 Hz. The generated audio signal is modulated with the modulator signal in block 31. The output from the modulation block 31 is used to drive a speaker as shown in block 35. In a preferred embodiment, the volume of the broadcast audio signal will be proportional to the tone signal strength. It will be appreciated that the tone signal may be out of the audio band, thereby the audio signal enables a human-perceivable signal to be generated responsive to detecting the tone signal.

Importantly, signals in area 37 are operated at a frequency unrelated to the detected tone signal. Accordingly, the audio signal output from the speaker is at a frequency unrelated to the tone signal, but yet indicates the relative strength of the tone signal in its volume. In this regard, area 37 acts to isolate the speaker audio from the tone generator signal, thus reducing or eliminating the risk of feedback and other disturbances.

Figure 2:
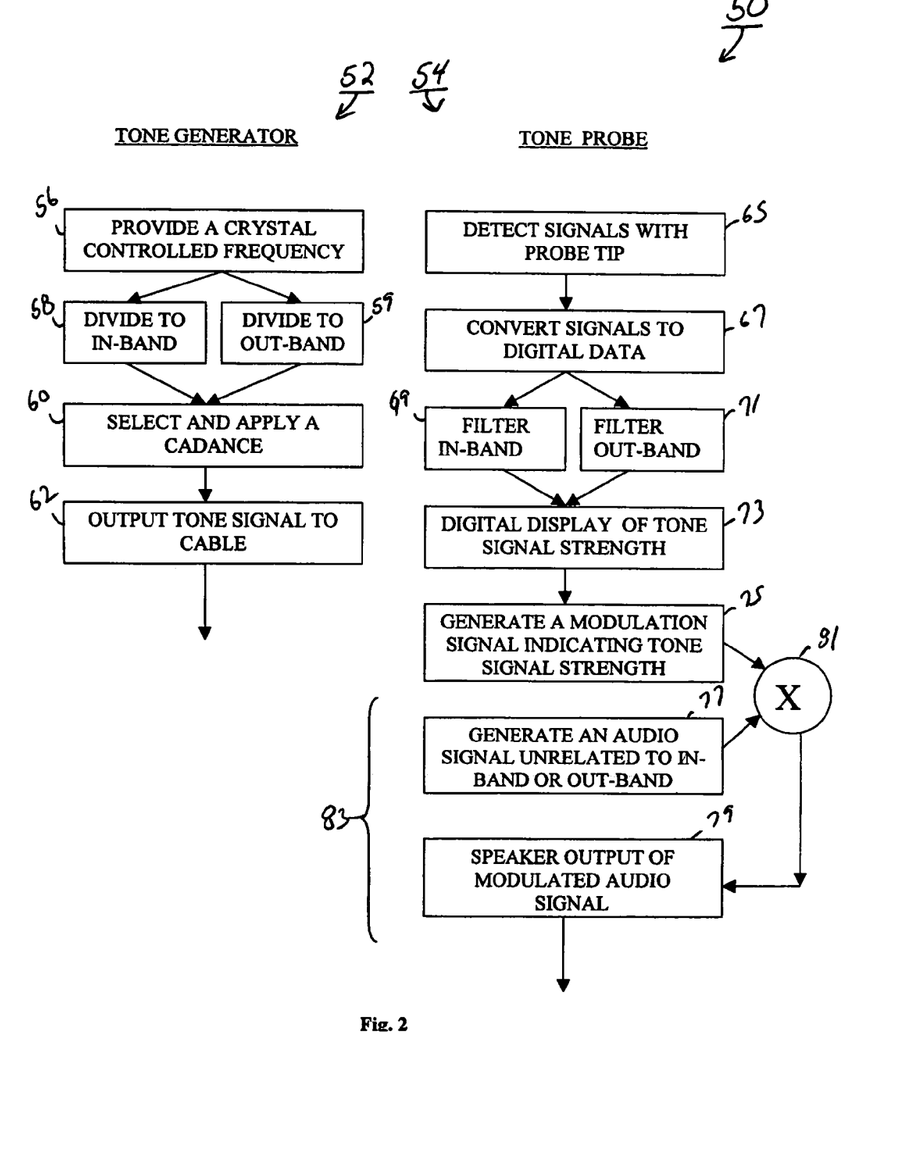
FIG. 2 is a block diagram of another method for a cable test system in accordance with the present invention.

Referring now to FIG. 2 another testing system 50 is disclosed. Testing system 50 is similar to previously described testing system 10 so only differences will be described in detail. Testing system 50 has a tone generator 52 and a tone probe 54. The tone generator 52 provides an accurate signal frequency in the form of a crystal controlled oscillator signal, as shown in block 56. The crystal controlled oscillator provides a highly accurate and stable frequency source for generating the tone signal.

Tone generator 52 is constructed to generate tone signals in at least two frequencies. For example in block 58 the tone generator 52 divides the crystal frequency to an in-band frequency. An in-band frequency is a frequency within the range of expected frequencies operating on the cable. For example, a standard analog voice telephone communication cable typically operates with signals in the range of about 250 Hz to about 4 KHz. In this regard, out-band frequencies would be those outside the normal range of operation. It will be appreciated that the in-band frequency may be alternatively defined depending upon specific application.

Selectively, the crystal frequency may be divided to an out-band frequency as shown in block 59. An out-band frequency would be a frequency outside the in-band frequencies. For example, if the in-band frequency has a maximum of 4 KHz then the out-band frequency may be any signal frequency above, for example, 5 KHz. Although other frequencies are contemplated, in a preferred embodiment the out-band signal is provided in the audible band. The use of an out-band frequency may provide additional benefits as testing may be done without interference from existing signal traffic on the test cable, and testing may be done without substantially interfering with existing signals on the cable.

The tone signal generated in either block 58 or block 59 is then gated through a cadence pattern as shown in block 60. By using a cadence pattern, the tone signal may be applied to the test cable in a manner more distinguishable by a user. The output tone signal with the cadence pattern is output to the test cable as shown in block 62. It will be appreciated that the tone generator 52 may have a single cadence pattern or may provide for user selectable cadence patterns. Further, the tone generator may even provide for a user definable cadence pattern.

Tone probe 54 is used to detect a tone signal on the test cable as shown in block 65. In a preferred embodiment, an analog to digital converter converts the cable signal to a digital data stream in block 67. The digital data is digitally processed in blocks 69 or 71 to pass only selected frequencies. In this regard, the filters act as a narrow bandpass for passing the frequency of the expected tone signal on the test cable. For example, in block 69 the digital filter would be set to pass the in-band frequency, such as an in-band frequency set in block 58. In a similar manner, filter in block 71 may be set to pass an out-band frequency corresponding to the frequency set by block 59 in the tone generator 52. It would be appreciated that the tone probe 54 may permit the bandpass filter to be adjusted to other frequencies. For example, the tone probe could provide for discreet frequencies or could permit user definable bandpass characteristics.

The output from filter 69 or filter 71 will be a digital data stream indicative of the strength of the tone signal on the test cable. In this regard block 73 shows that the tone probe 54 may contain a digital display, such as an array of LEDs, for digitally representing the relative strength of the tone signal. Alternatively, the digital display may have a single LED with brightness variable responsive to the strength of the tone signal. It will be appreciated that the digital indicator may take other forms consistent with this disclosure. It would be understood that such a digital display would be an optional feature on the tone probe 54.

The data stream from block 73 is then used to generate a modulation signal indicating signal strength as shown in block 75. In a preferred embodiment, the modulation signal is an analog representation of the digital data from block 73. However, it would be appreciated that modulation may also be accomplished in the digital domain.

In block 77 an audio signal is generated at a frequency unrelated to the expected frequency of the tone signal. In a preferred embodiment the audio signal is generated as an analog signal, however it would be appreciated that a digital representation could be used.

In block 81 the audio signal is modulated with the modulation signal to generate an audio signal to be driven into a speaker in block 79. Accordingly, the speaker would output an audible sound at a frequency unrelated to the tone signal on the test cable, thereby minimizing feedback or other undesirable effects. Although the frequency of the speaker output is unrelated to the tone signal, the volume of the speaker output is proportional to the relative strength of the tone generator signal on the test cable. In this regard a user audibly perceives the presence and relative strength of the tone signal on the test cable.

Figure 3:
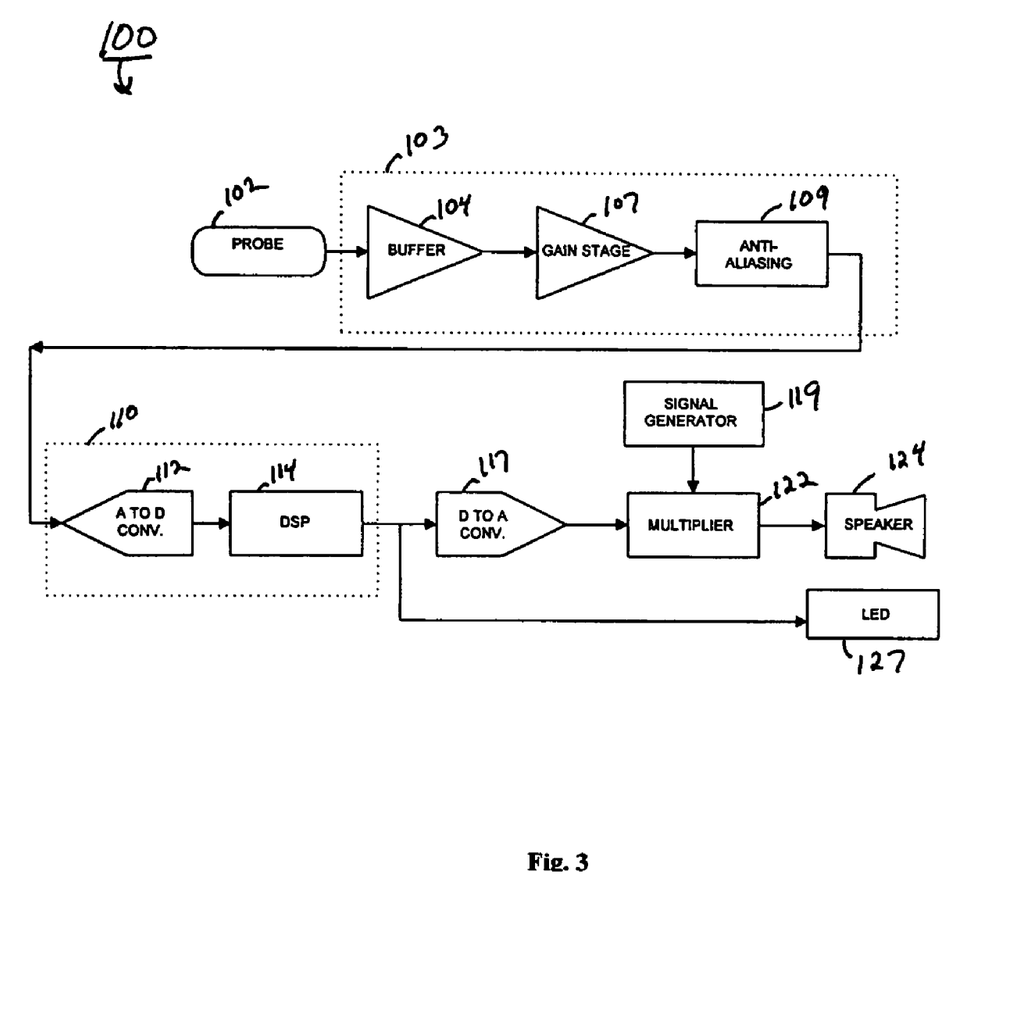
FIG. 3 is a block diagram of a tone probe in accordance with the present invention.

Referring now to FIG. 3, a block diagram of a tone probe, such as tone probe 54 is shown. Tone probe 100 has a probe tip 102 for receiving a cable signal. Probe tips are well known and will not be described in detail. The cable signal received from probe 102 is preferable preprocessed before filtering. For example tone probe 100 has preprocessing stage 103. Preprocessing stage 103 includes a buffer 104, and gain stage 107, and an anti aliasing filter 109. It will be appreciated that other preprocessing circuitry can be used consistent with this disclosure.

Buffer 104 is an input protection buffer designed to protect against over voltages and over currents. For example the input protection buffer may protect against an electrostatic discharge event, or may protect a user if the user accidentally touches the probe tip to a live power source. It will be appreciated that other types of fusing circuitry may be used to accomplish such input isolation.

Gain stage 107 is an amplification circuit for amplifying the cable signal coming from the probe 102. By using gain stage 107, the small signal levels coming from the probe 102 may be amplified to more usable levels, thereby permitting the use of more cost effective parts. The anti-aliasing filter 109 is a low pass filter intended to remove the high frequency content from the signal detected by probe 102. In a preferred embodiment the anti-aliasing filter has a cutoff frequency of about 20 KHz to about 50 KHz. Since the tone generator will be typically operating at audio frequency levels, frequencies above 20 KHz may be removed without adversely affecting performance of the tone probe 100.

The signal from the preprocessing section 103 is then passed through a high-Q band pass filter 110. As a high-Q band pass filter, the filter 110 is constructed to pass only those frequencies very near the expected frequency of the tone signal. In a preferred embodiment, the band pass filter 110 is implemented digitally. More specifically, the signal from the anti-aliasing filter 109 is input to an analog the digital converter 112 and a digital signal processor (DSP) 114 is used to reject signals outside the band pass range. Although the preferred embodiment implements the DSP as an integrated device, it will be appreciated that discreet logic may be used.

The analog to digital (A to D) converter is operated at a frequency well over the expected frequency of the tone signal. For example, preferably the A to D converter is operated at a sampling frequency that is about 10 to 20 times the expected frequency of the tone signal. By operating the A to D converter in such a manner, and due to the signal rejection in the anti-aliasing filter, the digital signal processor 114 is able to accurately pass a very narrow range of frequencies. For higher Q operation in specific applications, the sampling frequency may be even further increased. Accordingly, data passed by the digital signal processor 114 is likely to represent the relative magnitude of the tone signal present on the test cable. Although tone probe 100 implements the band pass filter 110 as a digital system, it will be appreciated that the high-Q filter may also be implemented using an analog circuit.

As described above the digital data from the digital signal processor 114 digitally represents the relative strength of the detected tone generator signal. Accordingly, LED array 127 may be used to visually display the relative strength of the detected signal. It will be appreciated, however, that such visual display would be optional to the tone probe 100.

The digital signal coming from the digital signal processor 114 is converted to an analog signal by a digital to analog (D to A) converter 117. The analog signal coming from the D to A converter thereby has an analog level proportional to the detected signal strength of the tone signal.

Audio signal generator 119 generates an audio frequency signal at a frequency unrelated to the expected tone signal frequency. For example, if the expected frequency of the tone generator signal is about 800 Hz, then the signal generator 119 may generate a audio signal at, for example, 1250 Hz. Since the generated audio signal is unrelated to the frequency of the tone signal, interference, feedback and other undesirable effects are eliminated or reduced.

The generated audio signal and the modulation signal coming from the D to A converter 117 are then multiplexed by multiplier 122. Although tone probe 100 performs the multiplication in an analog format, it will be appreciated that a similar function could be accomplished in the digital domain. The output from multiplier 122 is driven, possibly through amplifiers, into a speaker 124. The output from speaker 124 is therefore at a frequency unrelated to the tone generator frequency but has a volume proportional to the detected strength of the tone signal.

Figure 4:
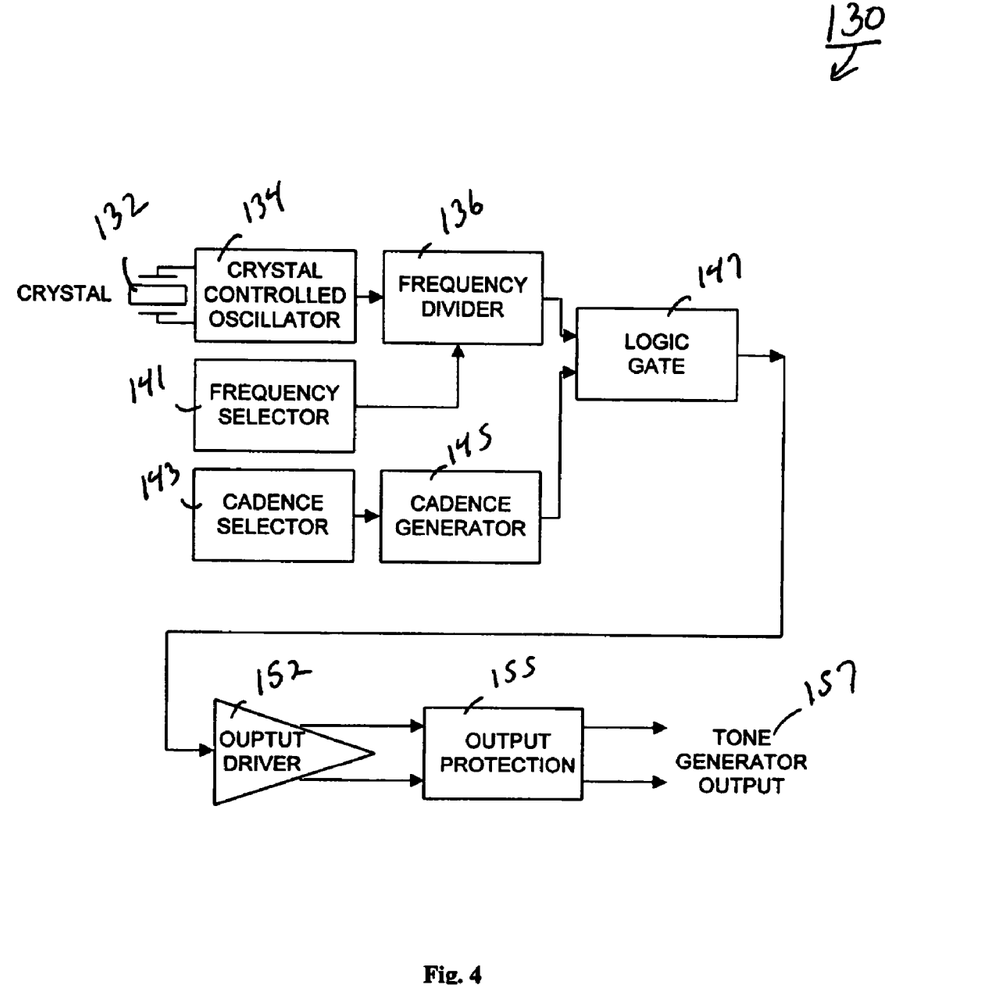
FIG. 4 is a block diagram of a tone generator in accordance with the present invention.

Referring now to FIG. 4 a crystal controlled tone generator 130 is shown. Tone generator 130 has a crystal providing an input to a crystal-controlled oscillator 134. Since the operation of crystal-controlled oscillators is well known, the functionality of the crystal 132 and crystal-controlled oscillator 134 will not be described in detail. The crystal-controlled oscillator provides a highly accurate and stable frequency signal to a frequency divider 136. In a preferred embodiment the crystal-controlled oscillator 134 provides a frequency of 4.00 MHz to the frequency divider 136. However, it will be appreciated that other frequencies may be used consistent with this disclosure.

The tone generator has a frequency selector 141 that provides an input to the frequency divider 136. In this manner the user is allowed to adjust the frequency output from the frequency divider 136. For example, as described earlier, a user may desire that a specific frequency be generated as a tone, either in-band or out-band. It will be appreciated that tone generator 130 may provide the frequency selector as a series of discreet selections, or it may be fully adjustable. In a preferred embodiment the frequency divider 136 is configured to divide the 4 MHz oscillator signal by 4096 to produce about a 977 Hz frequency for an in-band toning or to divide the 4 MHz oscillator signal by 512 to produce about a 7.8 KHz frequency for out-band toning. It will be appreciated that other frequencies may be selected consistent with this disclosure.

The in-band toning frequency of approximately 977 Hz is compatible with many known tone probes. The about 7.8 KHz frequency provided by the out-band toning selection is outside the typical bandwidth of standard telephone equipment, which has about a 4 KHz maximum. Out-band toning prevents unintended disruptions of telephone conversations or data communications by the tone signal.

The toning signal generated by the frequency divider 136 is applied to a logic gate 147. The other input to the logic gate 147 is provided from the cadence logic 143–145. The cadence logic provides a pattern effect to the toning signal to facilitate distinguishing from other tone generators. The cadence circuitry includes a cadence selector 143 for selecting a particular type of cadence. It will be understood that the cadence selector defines a single duty cycle pattern, or may be selectable among a variety of cadences. It will also be appreciated that cadences may be predefined, or the tone generator 130 may permit user definable cadences.

The cadence generator 145 produces a gating signal consistent with the desired cadence to the logic gate 147. The logic gate produces a toning signal responsive to the signal received from the cadence generator. For example if the cadence selector 143 is set to provide a simple "beeping" pattern where it is desired that the tone be active for one half second and off for one half second continuously, then the cadence generator simply generates a pulse every 1 second with a 50% duty cycle. The pulse is received at the logic gate, and when the pulse is "on" then the signal from the frequency divider 136 is passed through the logic gate 147, while when the pulse is "off" then the logic gate will not pass the signal from the frequency divider 136.

The pattern-toning signal from logic gate 147 is received into output driver 152. Output driver preferably provides a differential output comprised of two output signals that are 180 degrees out of phase from each other. A differential output is used to provide maximum output signal amplitude from the available power supply voltage. The differential outputs of the output driver 152 may be applied to output protection circuitry 155 to protect the output driver 152 from inadvertent application of potentially damaging voltages or currents. It will be appreciated that other types of amplification and fusing devices may be substituted consistent with this disclosure. The tone generator 130 thereby has an output 157 at a frequency selected by frequency selector 141 and a cadence selected by cadence selector 143.

In a preferred embodiment of the tone generator 132, crystal 132 has an accuracy of about 100 parts per million. Such a highly accurate crystal provides a tone generator output 157 with a very accurate and stable frequency. Such an accurate and stable frequency enables the corresponding tone probe to utilize a very high-Q filter to reject nearly all signals except signals matching the desired tone signal frequency.

It is therefore highly advantageous to use tone generator 130 in combination with tone probe 100 to provide a cable testing system. Because tone generator 130 generates such a highly stable, reliable, and accurate frequency for the tone signal output, the tone probe 100 is able to have a very high-Q band pass filter for rejecting all but the expected frequency.

Figure 5:
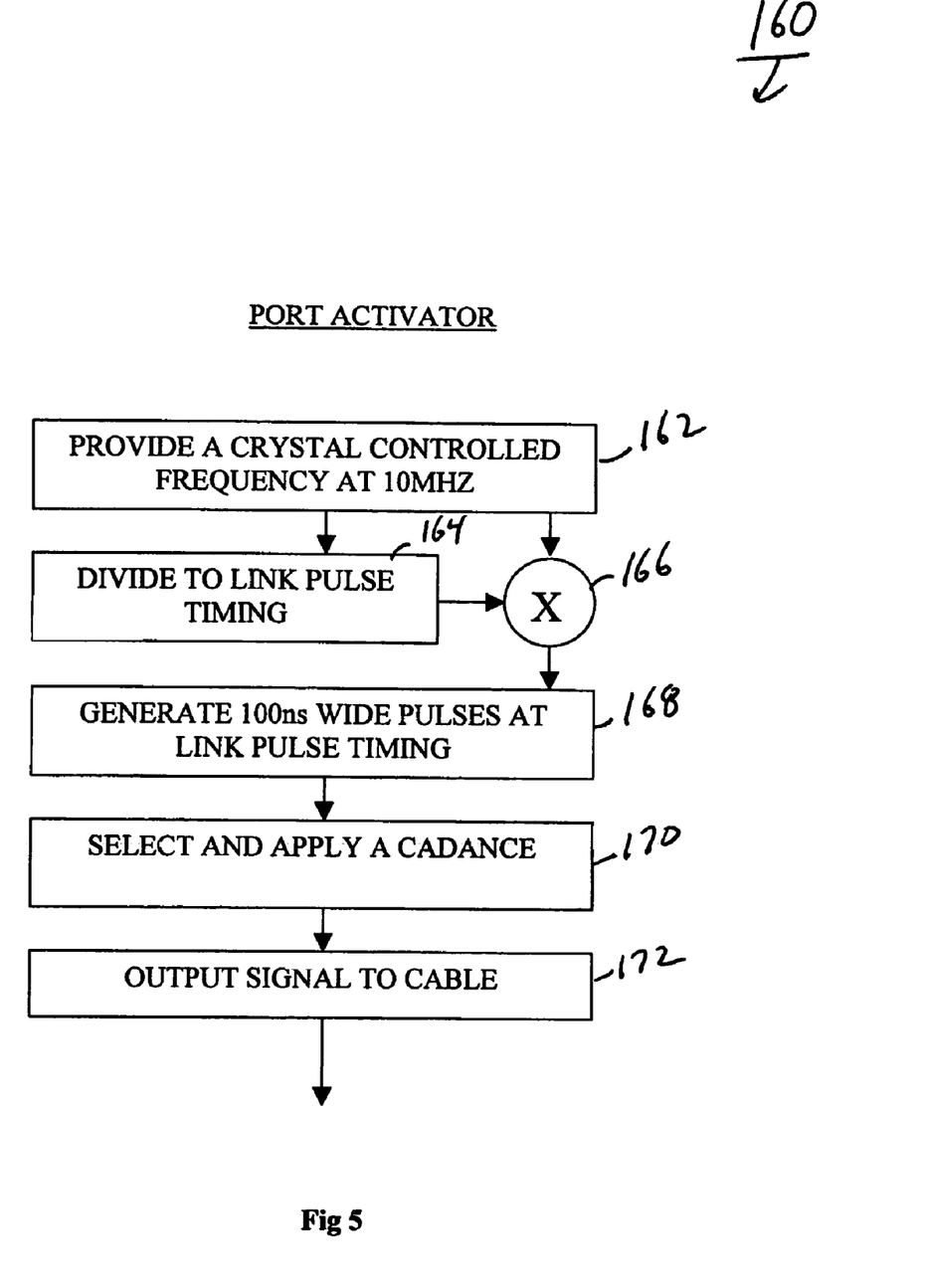
FIG. 5 is a block diagram of a port activation method in accordance with the present invention.

Referring now to FIG. 5 an optional port activation method 160 is shown. Port activation method 160 would be advantageously added as an option to a tone generator, such as tone generator 12 described in FIG. 1. Port activator method 160 has the desirable feature of enabling the tone generator to cause the link indicator on a network device to blink in a predetermined pattern.

According to the IEEE 802.3 Ethernet specification, Ethernet based network devices establish and maintain communication by verifying receipt of properly timed link pulses. Often, network devices have an LED to indicate they are receiving proper link pulses. In a particular example, a network closet may contain an array of hubs, all connected to servers, other hubs, and client devices. Each hub may have from 8 to 24 link LEDs, all indicting whether that hub port is properly receiving link pulses from its associated device. A chasis-based network hub may have more than 100 ports. In this regard even a moderately complex network closet may contain dozens, if not hundreds of LEDs indicating status of Ethernet connections via the link LEDs. Searching the closet for the specific port desired can be a tedious and unreliable job.

A tone generator with port activation method 160 could greatly simplify the process by blinking the desired link LED with a predetermined pattern cadence. In this regard a user would apply tone generator signal at the port in question, for example a wall port, and then enter the network closet and look for the link LED flashing with the desired pattern. Such a configuration not only enables easy identification of the port, but also quickly verifies that a physical connection is being properly made between the wall port and the hub.

The port activator method 160 is implemented by providing a highly accurate crystal controlled frequency as shown in block 162. In a preferred embodiment the crystal controlled frequency is at 10 MHz. This frequency is preferred as a 10 MHz signal provides a pulse width of 100 ns (nanosecond), which is the desired pulse width for a link pulse. It will be appreciated that other frequencies may be used for the crystal-controlled oscillator, however conversion to the 100 ns pulse width may require additional circuitry.

In block 164 the crystal-controlled frequency is divided to the link pulse timing as shown in block 164. The Ethernet standard provides for the specifications for link pulse timing so will not be described in detail here. In a preferred embodiment, the 10 MHz output of oscillator is divided by 163840 to produce a 61.03 Hz frequency, which complies with the timing requirements set by the Ethernet standard. It will be appreciated that other divide values and link pulse timings may be made consistent with the specification.

Block 166 acts as a gate to pass a single 100 ns pulse from block 162 responsive to the link pulse timing received from block 164. Therefore the output from block 166 is a continuous stream of 100 ns pulses at a rate of 61.03 Hz.

A cadence pattern is applied to the link pulse stream in block 170. It will be appreciated that the cadence pattern may be a simple continuous blinking pattern or may have more sophisticated duty-cycle pattern to distinguish between multiple port activators. It will also be appreciated that the port activator method 160 could be used with only a single cadence pattern, or may provide for usable, selectable, and even user definable cadences. The pattern of link pulses is then output to the Ethernet cable as shown in block 172.

It will be appreciated that if the port activator method 160 is added to the tone generator 52, then adjustments will have to be made in the divide blocks 58,59 to account for the 10 MHz preferred frequency signal. The port activator method 160 is preferably an optional accessory to a tone generator, such as tone generator 52. However, the port activator method may be implemented on a portable testing device without including audible tone generator features.

Figure 6:
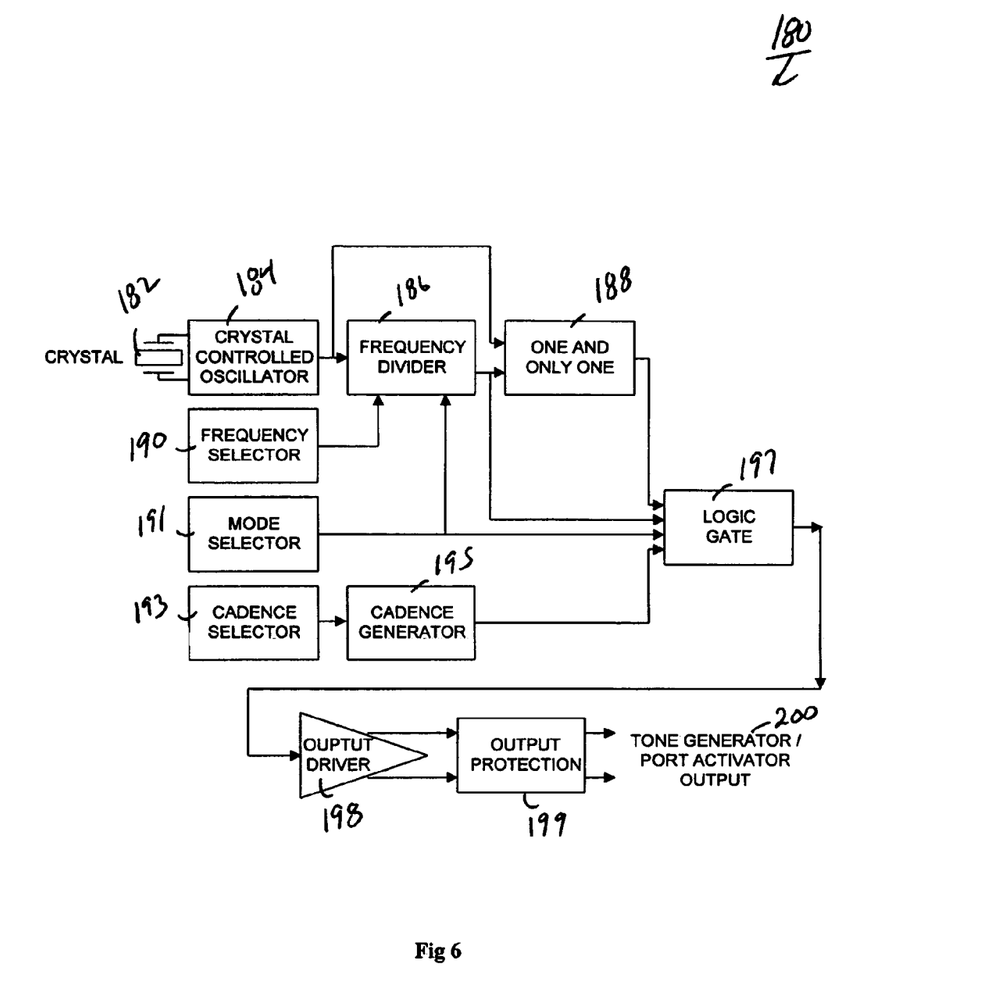
FIG. 6 is a block diagram of a tone generator having port activation circuitry in accordance with the present invention.

Referring now to FIG. 6 a generator 180 having both signal tone and port activator features is shown. Generator 180 has a crystal 182 driving a crystal-controlled oscillator 184. The crystal-controlled oscillator 184 preferably provides a highly accurate and stable frequency output of 10 MHz. A mode selector 191 selects whether the generator 180 is operating in tone generator mode or a port activator mode. Operation in tone generator mode will be described first.

When mode selector 191 is in tone generator mode, the frequency divider 186 is set to receive a frequency selector indicator from block 190. In a preferred embodiment the generator 180 allows for an in-band and an out-of-band tone frequency. When frequency selector 190 is set to in-band, the frequency divider 186 is set to divide the oscillator frequency by 10240 to produce about a 977 Hz frequency. Such a frequency is in-band and provides a tone signal compatible with tone probes from known sources.

If the frequency selector 190 is set to out-band, then frequency divider 186 divides the oscillator frequency by 1280 to produce 7.8125 KHz frequency for out-band toning. Out-of-band toning prevents unintended disruptions of telephone conversations or data communications by the tone signal.

Cadence circuitry 193,195 operates like cadence circuitry 143,145 so will not be described in detail. The output from the cadence generator 195 is received at logic gate 197. The output from the frequency divider 186 is gated with the output from cadence generator 195 to produce a patterned tone at the desired frequency. Output circuitry 198,199 is similar to output circuitry 152,155 so will not be described in detail. Accordingly, when the mode selector is set to tone generator mode, tone generator 180 outputs either an in-band or out-band tone signal at a predetermined cadence pattern.

When the mode selector is set to port activation mode, the generator 180 is designed to cause a link indicator light to flash at a predetermined cadence pattern. When in port activation mode, the frequency divider 186 divides the signal provided by the crystal-controlled oscillator 184 by 163840 to produce a 61.03 Hz frequency. The about 61 Hz frequency complies with the IEEE 802.3 Ethernet specification for link pulse timing. It will be appreciated that other timings may be used consistent with the Ethernet standard.

The about 61 Hz signal is an input to a one and only one 188 circuit. The other input to the one and only one circuit 188 is the 10 MHz signal from the oscillator 184. Since the oscillator is set at 10 MHz, the pulse stream received at the one and only one circuit 188 is a 100 ns wide pulse. Accordingly, the output from the one and only one circuit 188 is a 100 ns pulse at a rate of about 61 Hz.

The output from the one and only one circuit is received at logic gate 197. The logic gate is also receiving a cadence pattern from cadence circuitry 193,195. In this regard, the logic gate 197 applies a cadence to the link pulse stream. The output from the logic gate 197 is applied to output circuitry 198,199 and applied to an Ethernet cable. When generator 180 is in port activation mode, the link light on a coupled network device will flash at the pattern set by the cadence pattern.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A method of detecting an audio tone signal on a cable, the audio tone signal having a known frequency, comprising:
    detecting a cable signal using a probe tip;
    filtering the cable signal using a high-Q bandpass filter, the bandpass filter constructed to only pass signals near the frequency of the audio tone signal;
    generating a modulation signal indicative of the strength of the signals passed by the bandpass filter;
    generating an audio frequency signal that is unrelated to the frequency of the audio tone signal;
    modulating the audio frequency signal and the modulation signal to generate a modulated audio signal; and
    driving a speaker using the modulated audio signal.

2. The method according to claim 1, wherein the filtering step includes digitizing the cable signal and processing the digital data to provide the high-Q bandpass filter.

3. The method according to claim 1, wherein the bandpass filter is constructed to pass an in-band frequency, the in-band frequency band being within a range of about 250 Hz to about 4 KHz.

4. The method according to claim 1, wherein the bandpass filter is constructed to pass an out-band frequency, the out-band frequency band being above about 6 KHz.

5. The method according to claim 1 further including the step of using the signal from the bandpass filter to active a lamp circuit to visually display relative strength of the audio tone signal.

6. A tone probe for detecting a tone signal, comprising:
    a probe tip constructed to detect a cable signal transmitted on a test cable;
    a high-Q filter coupled to the probe tip and constructed to receive the cable signal and pass signals near the frequency of the tone signal;
    a conversion circuit coupled to the high-Q filter and constructed to use the passed signals to generate a modulation signal, the modulation signal being indicative of the strength of the tone signal present in the cable signal;
    an audio signal generator constructed to generate an audio signal at a frequency unrelated to the frequency of the tone signal;
    a modulation circuit coupled to the audio signal generator and the conversion circuit, the modulation circuit constructed to generate a modulated audio signal; and
    a speaker circuit coupled to the modulation circuit and constructed to audibly present the modulated audio signal.

7. The tone probe according to claim 6 wherein the high-Q filter is constructed using an analog to digital converter and digital processing circuitry.

8. The tone probe according to claim 6 wherein the conversion circuit is constructed using a digital to analog converter to generate the modulation signal as an analog signal.

9. The tone probe according to claim 6 further including a switch circuit coupled to high-Q bandpass filter, the switch selecting a bandpass frequency.

* * * * *